United States Patent
Wu et al.

(10) Patent No.: US 10,345,497 B2
(45) Date of Patent: Jul. 9, 2019

(54) OPTICAL ELEMENT

(71) Applicant: FORWARD OPTICS CO., LTD., Taichung (TW)

(72) Inventors: Huai-An Wu, Taichung (TW); Wei Shen, Taichung (TW); Yuan-Lin Lee, Taichung (TW)

(73) Assignee: FORWARD OPTICS CO., LTD., Taichung (TW)

( * ) Notice: Subject to any disclaimer, the term of this patent is extended or adjusted under 35 U.S.C. 154(b) by 113 days.

(21) Appl. No.: 15/729,787

(22) Filed: Oct. 11, 2017

(65) Prior Publication Data

US 2019/0079225 A1 Mar. 14, 2019

(30) Foreign Application Priority Data

Sep. 8, 2017 (TW) .............................. 106213344 U (51) Int. Cl.
| | |
|---|---|
| *G02B 3/00* | (2006.01) |
| *G02B 5/20* | (2006.01) |
| *G02B 6/28* | (2006.01) |
| *G02B 6/32* | (2006.01) |
| *G02B 6/42* | (2006.01) |
| *G02B 17/08* | (2006.01) |

(52) U.S. Cl.
CPC ........... *G02B 5/201* (2013.01); *G02B 6/2817* (2013.01); *G02B 6/32* (2013.01); *G02B 6/4206* (2013.01); *G02B 6/4214* (2013.01); *G02B 6/4286* (2013.01); *G02B 17/086* (2013.01); *G02B 3/0037* (2013.01)

(58) Field of Classification Search
CPC ........ G02B 5/201; G02B 6/32; G02B 6/4286; G02B 6/4214; G02B 6/2817; G02B 17/086; G02B 6/4206; G02B 3/0037; G02B 6/42; G02B 6/4246; G02B 27/0955; G02B 5/20
USPC ................................ 359/891, 885, 641–642
See application file for complete search history.

(56) References Cited

U.S. PATENT DOCUMENTS

| | | | | |
|---|---|---|---|---|
| 6,563,976 | B1 * | 5/2003 | Grann | G02B 6/29311 385/24 |
| 9,323,013 | B2 * | 4/2016 | Shao | G02B 6/4246 |
| 9,541,720 | B1 * | 1/2017 | Wu | G02B 6/4286 |
| 9,588,308 | B1 * | 3/2017 | Wu | G02B 6/4214 |
| 9,971,109 | B1 * | 5/2018 | Wu | G02B 6/32 |
| 2010/0265974 | A1 * | 10/2010 | Wang | H01S 5/4025 372/29.011 |
| 2012/0063721 | A1 * | 3/2012 | Chen | H04B 10/564 385/33 |

(Continued)

*Primary Examiner* — Jade R Chwasz
(74) *Attorney, Agent, or Firm* — Fish & Richardson P.C.

(57) ABSTRACT

An optical element includes a lens component and a filter. The lens component has first, second, third, fourth, fifth, sixth and seventh surfaces disposed around and parallel to a reference axis. The lens component further has spaced apart first and second collimating units formed on the first surface, and a third collimating unit formed on the second surface. The second collimating unit is located between the first and third collimating units. The third surface is formed with a groove defined by the fourth, fifth, sixth and seventh surfaces. The filter is disposed on the third surface, covers the groove, and has a first side surface facing the fourth, fifth, sixth and seventh surfaces, and a second side surface opposite to the first side surface.

12 Claims, 10 Drawing Sheets

(56) References Cited

U.S. PATENT DOCUMENTS

2012/0263416 A1* 10/2012 Morioka .............. G02B 6/4214
385/33
2014/0226988 A1* 8/2014 Shao ...................... H04B 10/40
398/139
2014/0314422 A1* 10/2014 Shao ...................... H04B 10/40
398/138
2017/0131474 A1* 5/2017 Dannenberg ............ H04J 14/02

* cited by examiner

OPTICAL ELEMENT

CROSS-REFERENCE TO RELATED APPLICATION

This application claims priority of Taiwanese Utility Model Application No. 106213344, filed on Sep. 8, 2017.

FIELD

The disclosure relates to an optical element, and more particularly to an optical fiber adapter.

BACKGROUND

A conventional optical element, such as those disclosed in U.S. Pat. No. 9,541,720 B1 and U.S. patent application Ser. No. 15/705,352, includes a light source disposed between a photo detector and an optical fiber. With such arrangement, it is not possible to place the photo detector between the light source and the optical fiber. Moreover, the photo detector of the conventional optical element of U.S. patent application Ser. No. 15/705,352 is located far away from the light source, thereby increasing the overall dimension of an optical instrument including the conventional optical element and the light source.

SUMMARY

Therefore, an object of the present disclosure is to provide an optical element that can alleviate the drawback associated with the prior arts.

According to a first aspect of the present disclosure, an optical element includes a lens component and a filter.

The lens component has a first surface, a second surface, a third surface, a fourth surface, a fifth surface, a sixth surface, a seventh surface, a first collimating unit, a second collimating unit and a third collimating unit. The first collimating unit is formed on the first surface. The second collimating unit is formed on the first surface and is spaced apart from the first collimating unit. The third collimating unit is formed on the second surface. The second collimating unit is located between the first and third collimating units. The first, second, third, fourth, fifth, sixth and seventh surfaces are disposed around and parallel to a reference axis. The third surface is formed with a groove that is defined by the fourth, fifth, sixth and seventh surfaces. The fourth and fifth surfaces respectively correspond to the first and second surfaces.

The filter is disposed on the third surface and covers the groove. The filter has a first side surface that faces the fourth, fifth, sixth and seventh surfaces, and a second side surface that is opposite to the first side surface.

When light beams incident on the first collimating unit propagate within the lens component along a first optical path to enter, by refraction through the fourth surface, and propagate within the groove to reach the first side surface, a part of the light beams enters, by refraction through the first side surface of the filter, and propagates within the filter along a second optical path, followed by being sequentially reflected by the second side surface, refracted through the first side surface, and refracted through the fifth surface to exit the lens component through the third collimating unit, and a remaining part of the light beams is reflected by the first side surface to propagate along a monitoring optical path and is sequentially refracted through the sixth surface and reflected by the seventh surface to exit the lens component through the second collimating unit.

According to a second aspect of the present disclosure, another optical element includes a lens component and a filter.

The lens component has a first surface, a second surface, a third surface, a fourth surface, a fifth surface, a first collimating unit, a second collimating unit and a third collimating unit. The first collimating unit is formed on the first surface. The second collimating unit is formed on the first surface and is spaced apart from the first collimating unit. The third collimating unit is formed on the second surface. The second collimating unit is located between the first and third collimating units. The first, second, third, fourth and fifth surfaces are disposed around and parallel to a reference axis. The third surface is formed with a groove that is defined by the fourth and fifth surfaces. The fourth and fifth surfaces respectively correspond to the first and second surfaces.

The filter is disposed on the third surface and covers the groove. The filter has a first side surface that faces the fourth and fifth surfaces.

When light beams incident on the first collimating unit propagate within the lens component along a first optical path to enter, by passing through the fourth surface, and propagate within the groove and are reflected by the first side surface to reach the fifth surface, a part of the light beams enters, by refraction through the fifth surface, and propagates within the lens component along a second optical path to exit the lens component through the third collimating unit, and a remaining part of the light beams is reflected by the fifth surface to propagate along a monitoring optical path and to exit the lens component through the second collimating unit.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
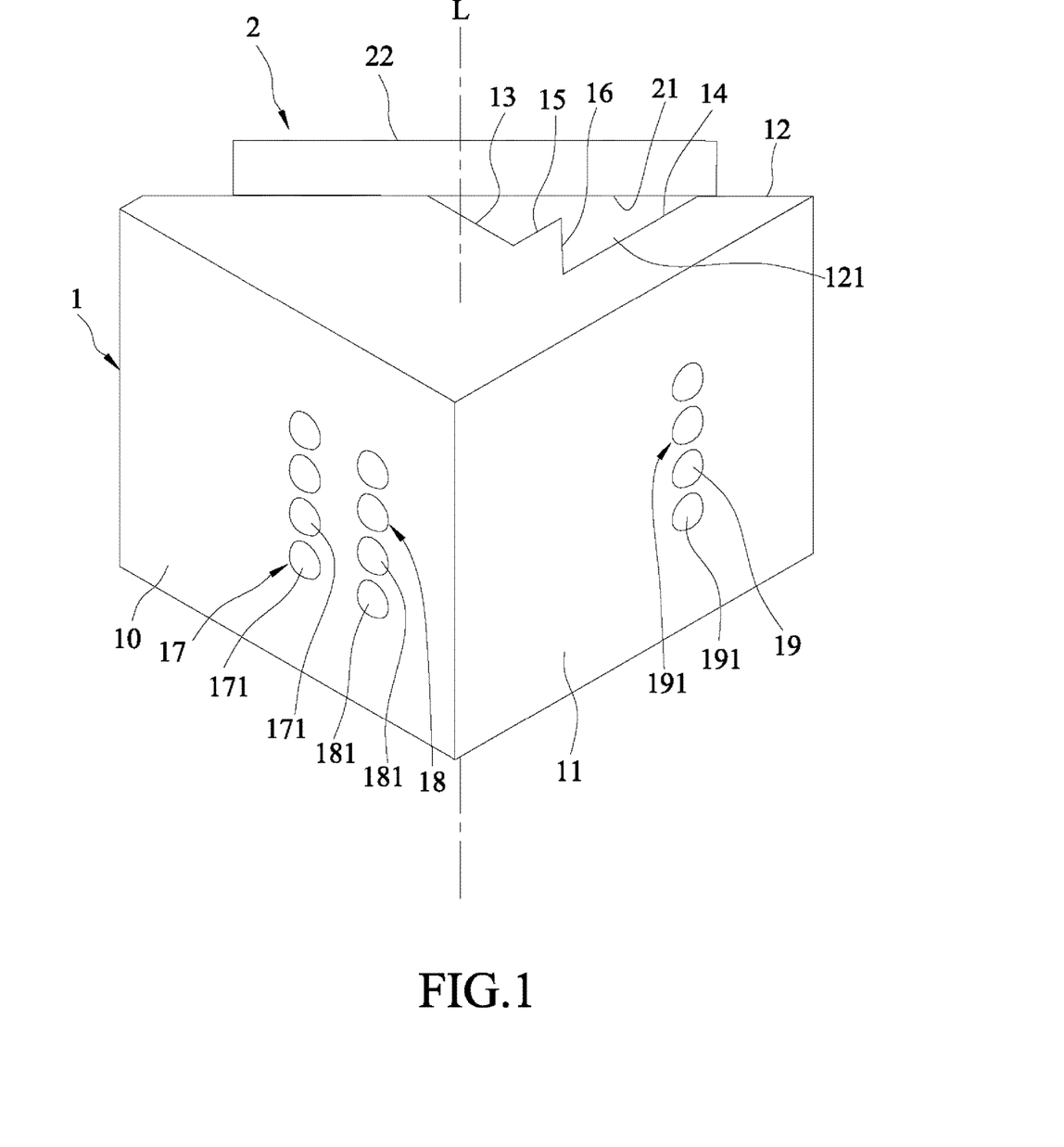
FIG. 1 is a perspective view of a first embodiment of an optical element of this disclosure.
Figure 2:
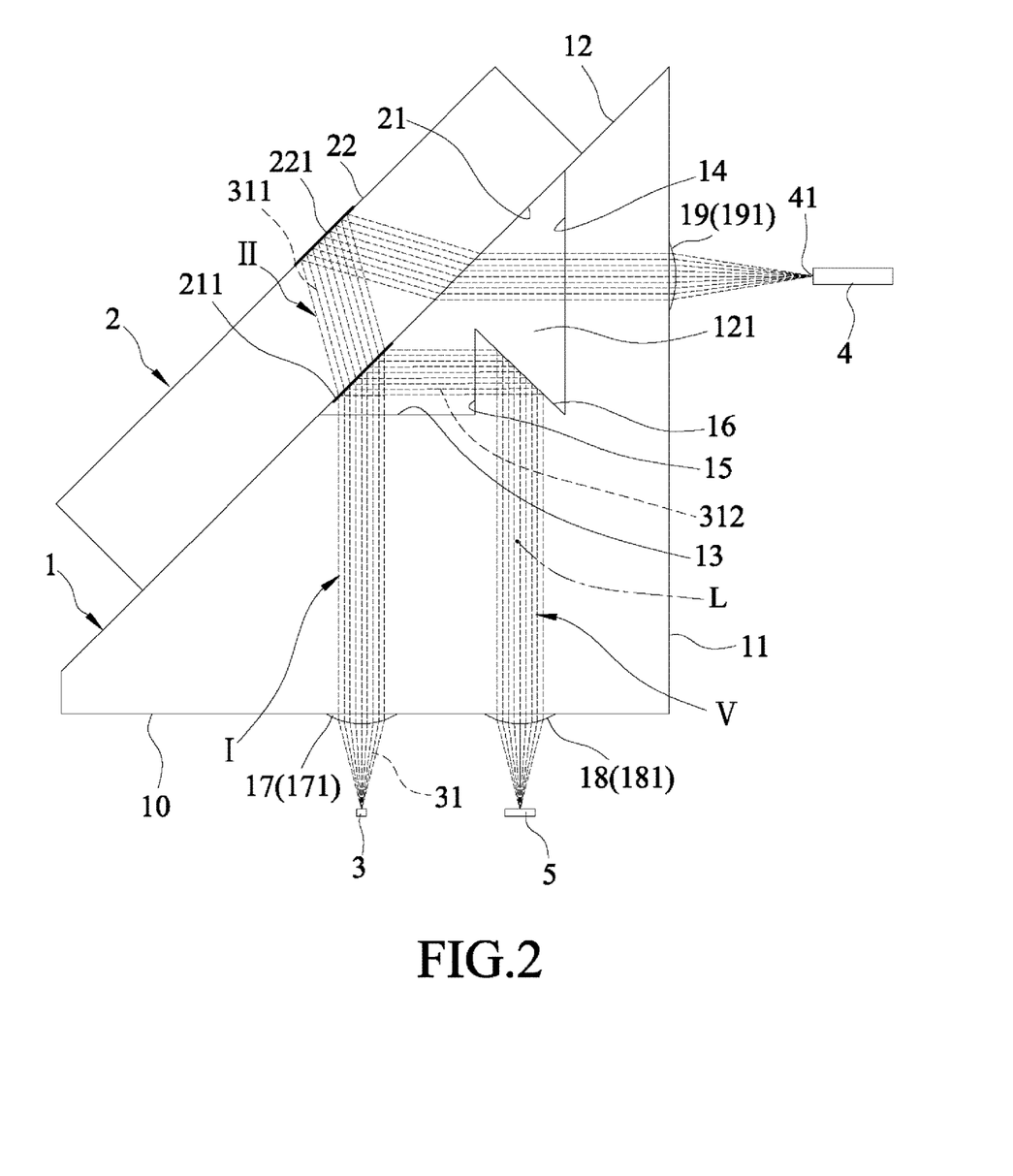
FIG. 2 is a schematic side view of the first embodiment, showing propagation of multiple light beams within the first embodiment.
Figure 3:
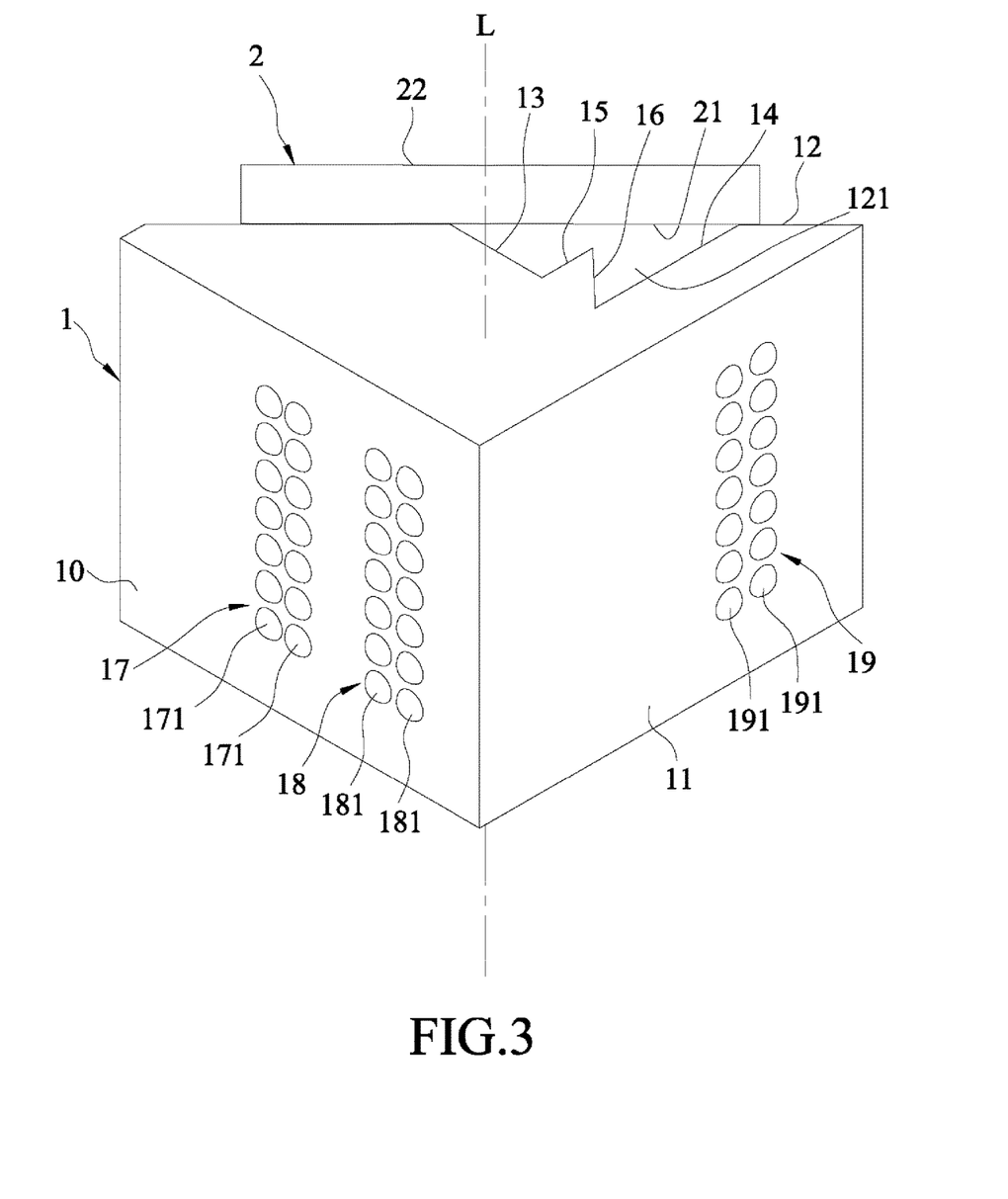
FIG. 3 is a perspective view of another configuration of the first embodiment.

Referring to FIGS. 1 to 3, a first embodiment of an optical element of this disclosure has a light-splitting function, and includes a lens component 1 and a filter 2.

The lens component 1 is made of one of glass and plastic. In this embodiment, the lens component 1 is made of plastic, which may be varied in other embodiments. The lens component 1 has a first surface 10, a second surface 11, a third surface 12, a fourth surface 13, a fifth surface 14, a sixth surface 15, a seventh surface 16, a first collimating unit 17, a second collimating unit 18 and a third collimating unit 19. The first collimating unit 17 is formed on the first surface 10. The second collimating unit 18 is formed on the first surface 10 and is spaced apart from the first collimating unit 17. The third collimating unit 19 is formed on the second surface 11. The second collimating unit 18 is located between the first and third collimating units 17, 19. The first, second, third, fourth, fifth, sixth and seventh surfaces 10, 11, 12, 13, 14, 15, 16 are disposed around and parallel to a reference axis (L). In this embodiment, the first surface 10 is perpendicular to the second surface 11, an angle defined between the first surface 10 and the third surface 12 is 45 degrees, and the first surface 10 and the fourth surface 13 are parallel to each other. It should be noted that the aforementioned configurations may be varied in other embodiments. The third surface 12 is formed with a groove 121 that is defined by the fourth, fifth, sixth and seventh surfaces 13, 14, 15, 16. The fourth and fifth surfaces 13, 14 respectively correspond to the first and second surfaces 10, 11.

The first collimating unit 17 includes a plurality of rounded first protrusions 171 arranged in a width direction which is parallel to the reference axis (L). The second collimating unit 18 includes a plurality of rounded second protrusions 181 arranged in the width direction. The third collimating unit 19 includes a plurality of rounded third protrusions 191 arranged in the width direction. It should be noted that, the first protrusions 171 may be arranged in the width direction in one row (see FIG. 1), and may also be arranged in the width direction in two juxtaposed rows (see FIG. 3). Likewise, each group of the second and third protrusions 181, 191 may be arranged in the width direction in one row (see FIG. 1) or in two juxtaposed rows (see FIG. 3).

The filter 2 is made of one of glass and plastic. In this embodiment, the filter 2 is made of glass, which may be varied in other embodiments. The filter 2 is disposed on the third surface 12 and covers the groove 121. The filter 2 has a first side surface 21 that faces the fourth, fifth, sixth and seventh surfaces 13, 14, 15, 16, and a second side surface 22 that is opposite to the first side surface 21.

When the optical element of this embodiment is applied to be an optical fiber adapter, the first protrusions 171 of the first collimating unit 17 are respectively aligned with a plurality of light source units 3 (only one is shown in FIG. 2). Each of the light source units 3 emits a plurality of light beams 31. The second protrusions 181 are respectively aligned with a plurality of photo detector units 5 (only one is shown in FIG. 2). Each of the third protrusions 191 is aligned with a receiving end 41 of a respective one of multiple optical fiber units 4 (only one is shown in FIG. 2).

For the sake of brevity, the propagation of the light beams 31 of one of the light source units 3 within this embodiment is described below. When light beams 31 incident on the first collimating unit 17 propagate within the lens component 1 along a first optical path (I) to enter, by refraction through the fourth surface 13, and propagate within the groove 121 to reach the first side surface 21, a part 311 of the light beams 31 enters, by refraction through the first side surface 21 of the filter 2, and propagates within the filter 2 along a second optical path (II), followed by being sequentially reflected by the second side surface 22, refracted through the first side surface 21, and refracted through the fifth surface 14 to exit the lens component 1 and to be focused at the receiving end 41 of the one of the optical fiber units 4 through the third collimating unit 19, and a remaining part 312 of the light beams 31 is reflected by the first side surface 21 to propagate along a monitoring optical path (V) and is sequentially refracted through the sixth surface 15 and reflected by the seventh surface 16 to exit the lens component 1 and to be focused at one of the photo detector units 5 through the second collimating unit 18. With such disposition, the photo detector units 5 is located between the light source units 3 and the optical fiber units 4 such that the overall dimension of the optical fiber adapter is reduced without affecting the intensity of the light beams 31 and the sensitivity of the optical fiber adapter.

It is worth mentioning that, in this embodiment, the first side surface 21 of the filter 2 is formed with a plated film 211 and the second side surface 22 of the filter 2 is formed with a plated film 221, each of which controls the energy of the light beams 31 reflected thereby. Specifically, referring to FIG. 2, the energy of the part 311 and the remaining part 312 of the light beams 31 may be controlled by the plated film 211. The larger the reflectivity of the plated film 211, the larger the energy of the remaining part 312 of the light beams 31 becomes while the smaller the energy of the part 311 of the light beams 31 becomes. It should be noted that the material of the plated film 211 may be changed for adjusting the reflectivity of the light beams 31 on the plated film 211 and then modifying the energy distribution between the part 311 and the remaining part 312 of the light beams 31. The plated film 211 may include a plurality of thin layers formed by coating process, and each layer is composed of one of $SiO_2$ and $TiO_2$. Similarly, the energy of the part 311 of the light beams 31 may be controlled by the plated film 221 by changing the material of the plated film 221 to achieve different reflectivity.

In certain embodiments, the reflection of the part 311 of the light beams 31 by the second side surface 22 is controlled to be a total reflection, and the reflection of the remaining part 312 of the light beams 31 by the seventh surface 16 is controlled to be a total reflection, thereby minimizing energy loss of the part 311 and the remaining part 312 of the light beams 31.

Figure 4:
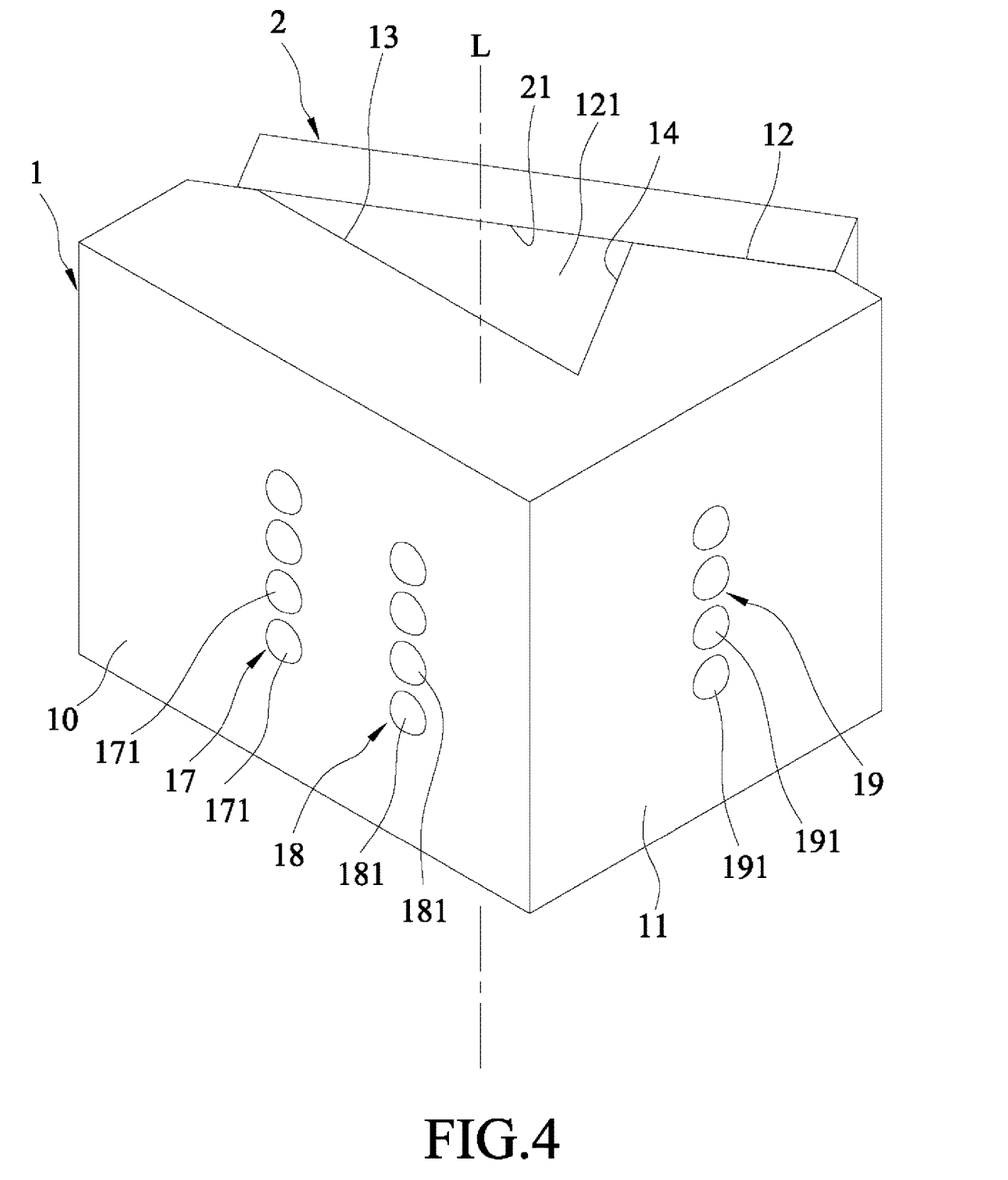
FIG. 4 is a perspective view of a second embodiment of the optical element of this disclosure.
Figure 5:
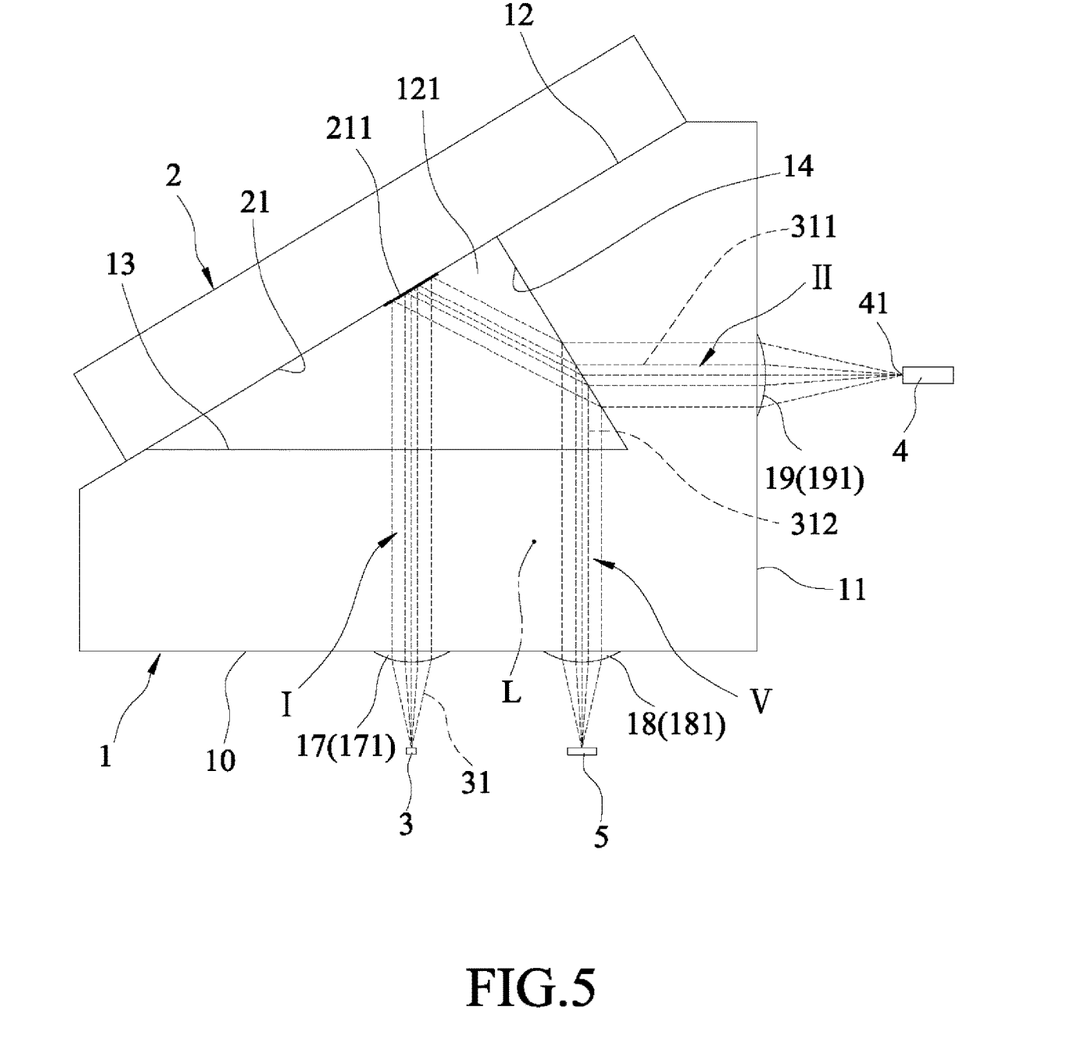
FIG. 5 is a schematic side view of the second embodiment, showing propagation of multiple light beams within the second embodiment.
Figure 6:
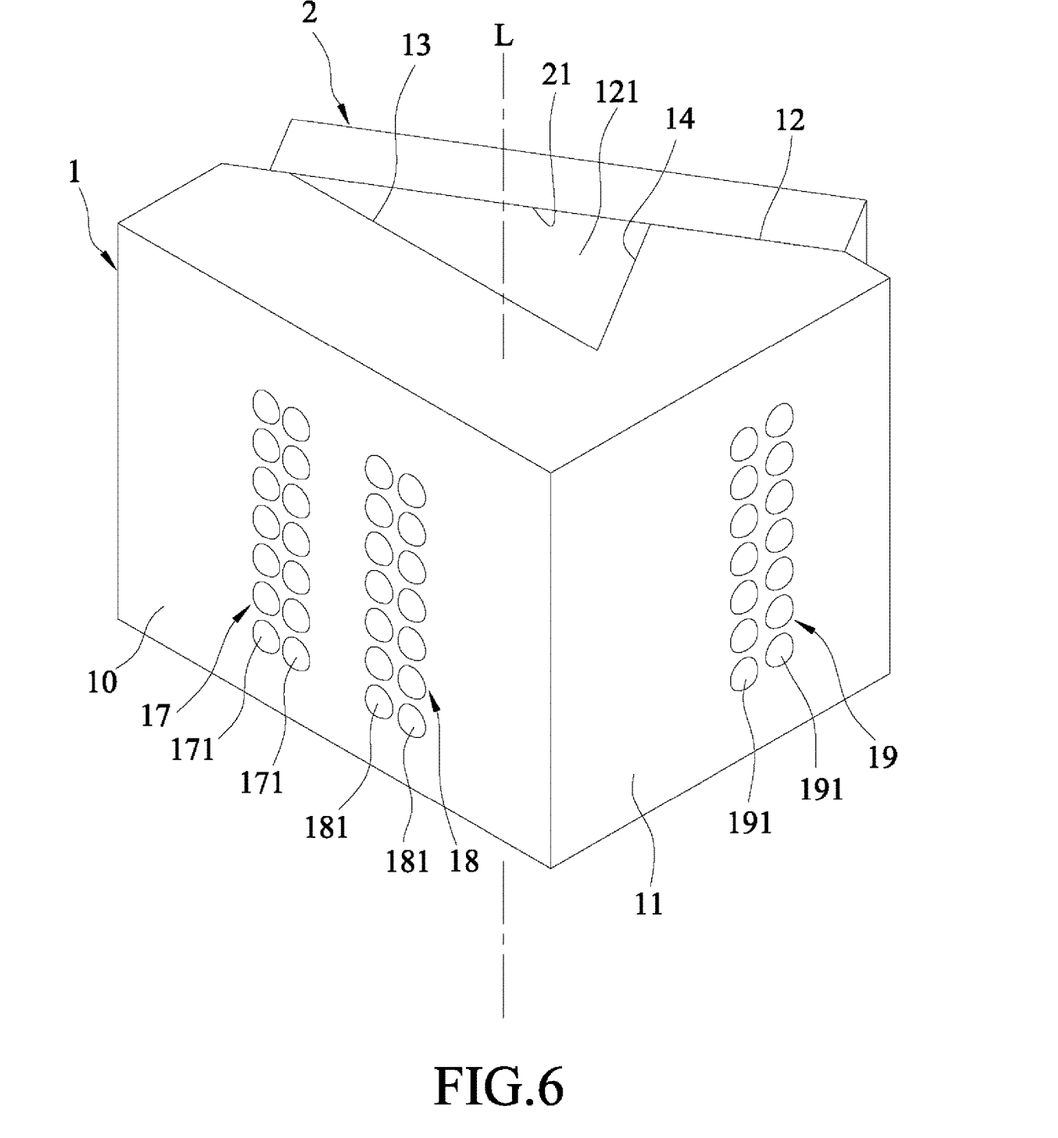
FIG. 6 is a perspective view of another configuration of the second embodiment.

Referring to FIGS. 4 to 6, a second embodiment of the optical element of this disclosure includes the lens component 1 and the filter 2.

The lens component 1 is made of one of glass and plastic. In this embodiment, the lens component 1 is made of plastic, which may be varied in other embodiments. The lens component 1 has a first surface 10, a second surface 11, a third surface 12, a fourth surface 13, a fifth surface 14, a first collimating unit 17, a second collimating unit 18 and a third collimating unit 19. The first collimating unit 17 is formed on the first surface 10. The second collimating unit 18 is formed on the first surface 10 and is spaced apart from the first collimating unit 17. The third collimating unit 19 is formed on the second surface 11. The second collimating unit 18 is located between the first and third collimating units 17, 19. The first, second, third, fourth and fifth surfaces 10, 11, 12, 13, 14 are disposed around and parallel to a reference axis (L). In this embodiment, the first surface 10 is perpendicular to the second surface 11, and such configuration may be varied in other embodiments. The third surface 12 is formed with a groove 121 that is defined by the fourth and fifth surfaces 13, 14. The fourth and fifth surfaces 13, 14 respectively correspond to the first and second surfaces 10, 11.

The first collimating unit 17 includes a plurality of rounded first protrusions 171 arranged in a width direction which is parallel to the reference axis (L). The second collimating unit 18 includes a plurality of rounded second protrusions 181 arranged in the width direction. The third collimating unit 19 includes a plurality of rounded third protrusions 191 arranged in the width direction. It should be noted that, the first protrusions 171 may be arranged in the width direction in one row (see FIG. 4), and may also be arranged in the width direction in two juxtaposed rows (see FIG. 6). Likewise, each group of the second and third protrusions 181, 191 may be arranged in the width direction in one row (see FIG. 4) or in two juxtaposed rows (see FIG. 6).

The filter 2 is made of one of glass and plastic. In this embodiment, the filter 2 is made of glass, which may be varied in other embodiments. The filter 2 is disposed on the third surface 12 and covers the groove 121. The filter 2 has a first side surface 21 that faces the fourth and fifth surfaces 13, 14.

When the optical element of this embodiment is applied to be the optical fiber adapter, the first protrusions 171 of the first collimating unit 17 are respectively aligned with a plurality of light source units 3 (only one is shown in FIG. 5). Each of the light source units 3 emits a plurality of light beams 31. The second protrusions 181 are respectively aligned with a plurality of photo detector units 5 (only one is shown in FIG. 5). Each of the third protrusions 191 is aligned with a receiving end 41 of a respective one of multiple optical fiber units 4 (only one is shown in FIG. 5).

For the sake of brevity, the propagation of the light beams 31 of one of the light source units 3 within this embodiment is described below. When light beams 31 incident on the first collimating unit 17 propagate within the lens component 1 along a first optical path (I) to enter, by passing through the fourth surface 13, and propagate within the groove 121 and are reflected by the first side surface 21 to reach the fifth surface 14, a part 311 of the light beams 31 enters, by refraction through the fifth surface 14, and propagates within the lens component 1 along a second optical path (II) to exit the lens component 1 and to be focused at the receiving end 41 of the one of the optical fiber units 4 through the third collimating unit 19, and a remaining part 312 of the light beams 31 is reflected by the fifth surface 14 to propagate along a monitoring optical path (V) and to exit the lens component 1 and to be focused at one of the photo detector units 5 through the second collimating unit 18.

In this embodiment, the first side surface 21 of the filter 2 is formed with a plated film 211, which is, as described above, capable of controlling the energy of the light beams 31 reflected thereby.

Figure 7:
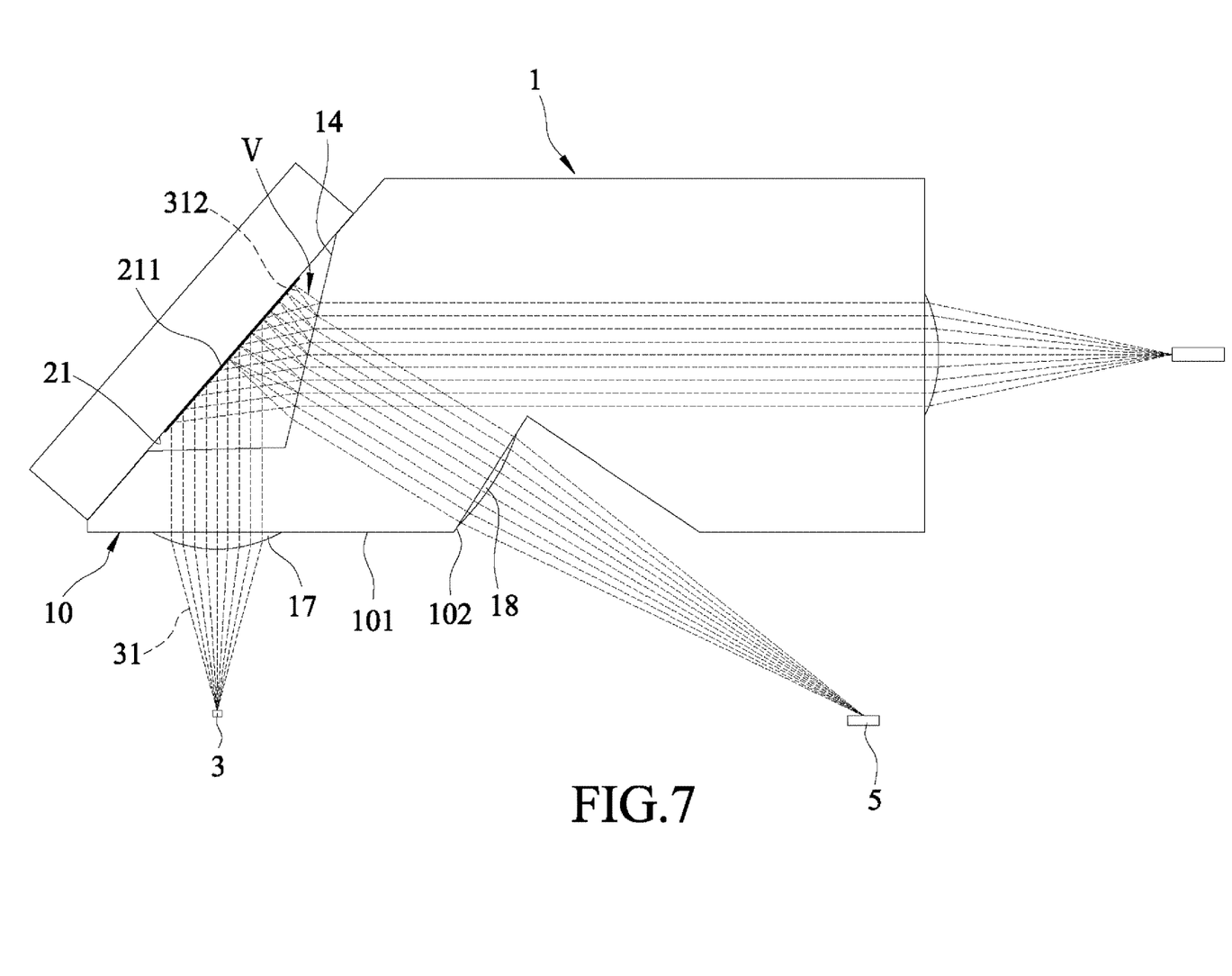
FIG. 7 is a schematic side view of a third embodiment of the optical element of this disclosure, showing propagation of multiple light beams within the third embodiment.

Referring to FIG. 7, a third embodiment of the optical element of this disclosure has a structure modified from that of the second embodiment. In the third embodiment, the first surface 10 has an incident surface portion 101 and an exit surface portion 102. The first collimating unit 17 is formed on the incident surface portion 101. The second collimating unit 18 is formed on the exit surface portion 102. The remaining part 312 of the light beams 31, after being reflected by the fifth surface 14 and before exiting the lens component 1, is subsequently reflected by the first side surface 21 and refracted by the fifth surface 14 to exit the lens component 1 and to be focused at one of the photo detector units 5 through the second collimating unit 18.

Figure 8:
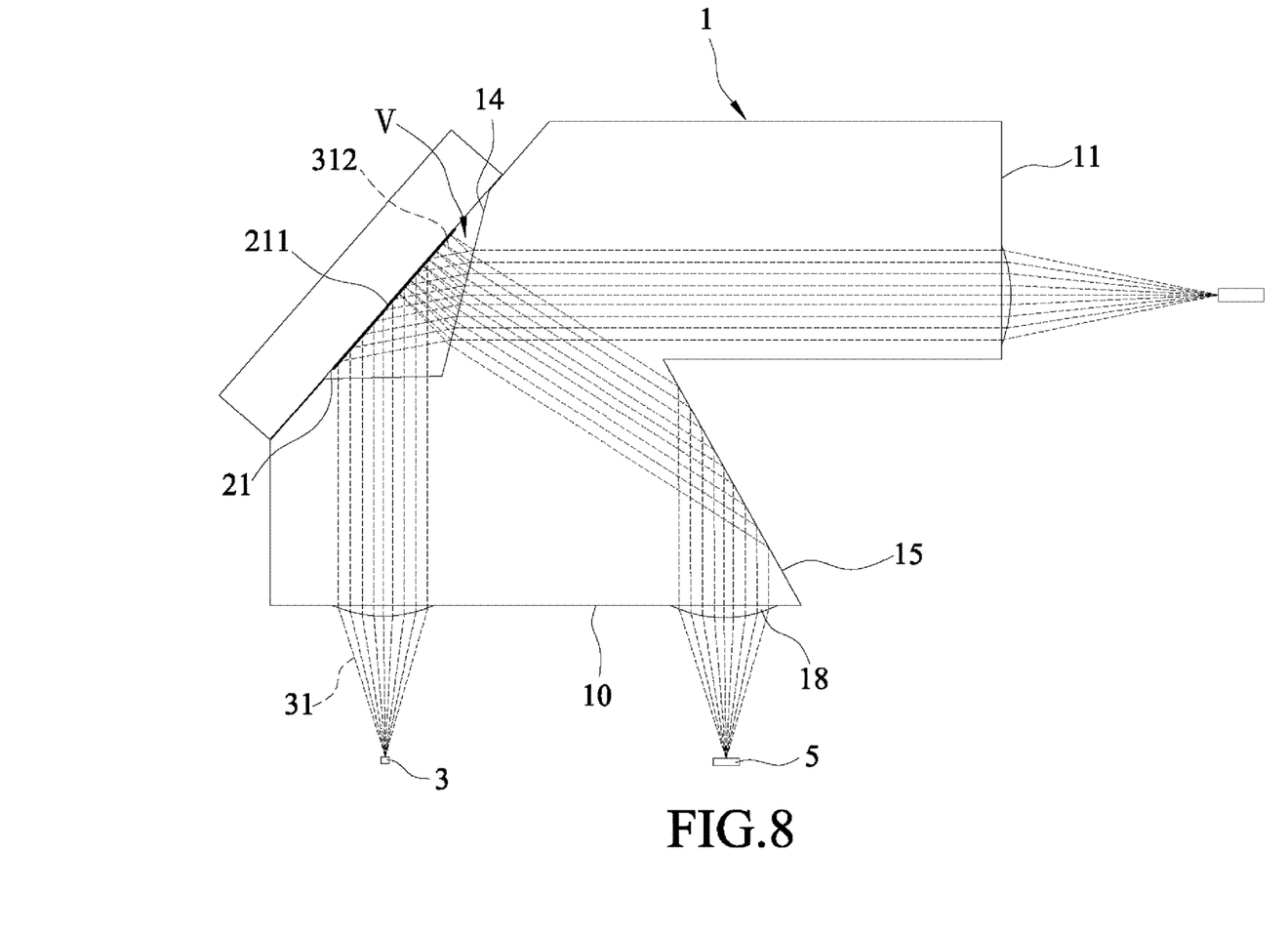
FIG. 8 is a schematic side view of a fourth embodiment of the optical element of this disclosure, showing propagation of multiple light beams within the fourth embodiment.

Referring to FIG. 8, a fourth embodiment of the optical element of this disclosure has a structure modified from that of the second embodiment. In the fourth embodiment, the lens component 1 further has a sixth surface 15 disposed between the first and second surfaces 10, 11 and corresponding to the fifth surface 14. The remaining part 312 of the light beams 31, after being reflected by the fifth surface 14 and before exiting the lens component 1, is sequentially reflected by the first side surface 21, refracted through the fifth surface 14, and reflected by the sixth surface 15 to exit the lens component 1 and to be focused at one of the photo detector units 5 through the second collimating unit 18.

In the fourth embodiment, the reflection of the remaining part 312 of the light beams 31 by the sixth surface 15 is a total reflection.

Figure 9:
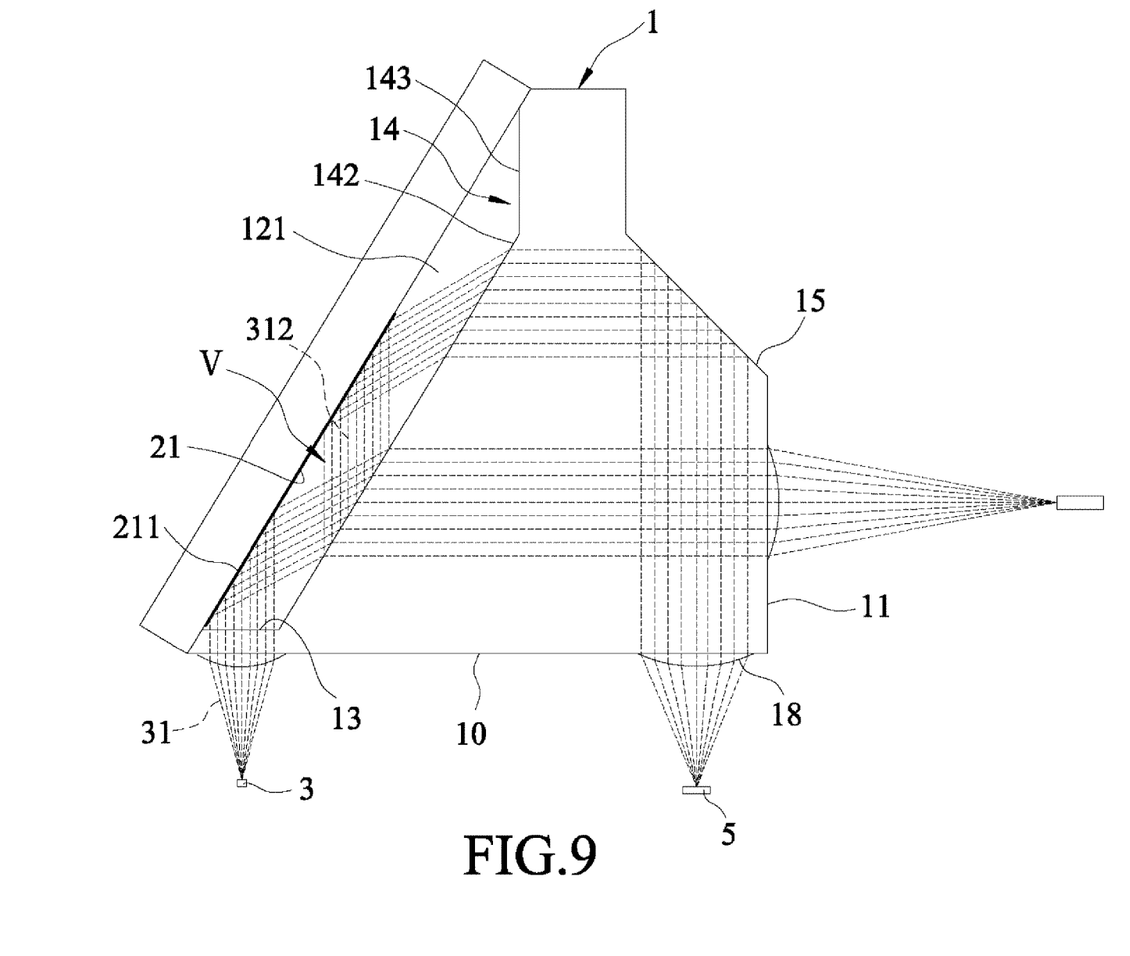
FIG. 9 is a schematic side view of a fifth embodiment of the optical element of this disclosure, showing propagation of multiple light beams within the fifth embodiment.

Referring to FIG. 9, a fifth embodiment of the optical element of this disclosure has a structure modified from that of the second embodiment. In the fifth embodiment, the lens component 1 further has a sixth surface 15 corresponding to the fifth surface 14. The fifth surface 14 has a flat surface portion 142 and an extending surface portion 143. The groove 121 is defined by the fourth surface 13 and the flat surface and extending surface portions 142, 143 of the fifth surface 14. The second surface 11 is disposed between the first surface 10 and the sixth surface 15. The remaining part 312 of the light beams 31, after being reflected by the flat surface portion 142 of the fifth surface 14 and before exiting the lens component 1, is sequentially reflected by the first side surface 21, refracted through the flat surface portion 142, reflected by the sixth surface 15 to exit the lens component 1 and to be focused at one of the photo detector units 5 through the second collimating unit 18.

In the fifth embodiment, the reflection of the remaining part 312 of the light beams 31 by the sixth surface 15 is a total reflection.

Figure 10:
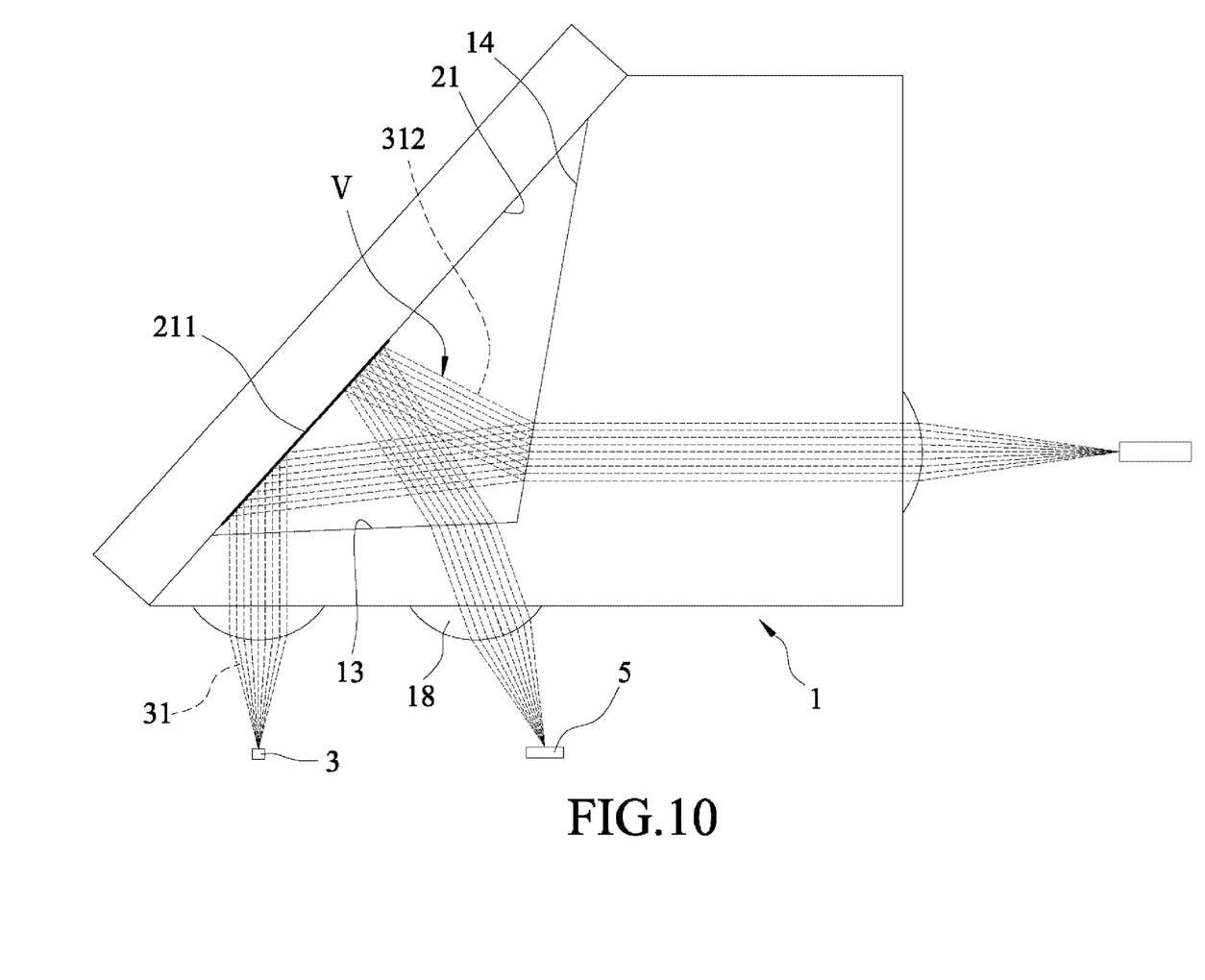
FIG. 10 is a schematic side view of a sixth embodiment of the optical element of this disclosure, showing propagation of multiple light beams within the sixth embodiment.

Referring to FIG. 10, a sixth embodiment of the optical element of this disclosure has a structure modified from that of the second embodiment. In the sixth embodiment, the remaining part 312 of the light beams 31, after being reflected by the fifth surface 14 and before exiting said lens component 1, is sequentially reflected by the first side surface 21 and refracted through the fourth surface 13 to exit the lens component 1 and to be focused at one of the photo detector units 5 through the second collimating unit 18.

This disclosure can guide a part of the light beams 31 (i.e., the remaining part 312 of the light beams 31) into the one of the photo detector units 5 for monitoring the light energy. Such closed-loop feedback function can increase the stability of the light signals to satisfy the requirement of high bandwidth signal transmission.

In addition, when a laser light source is used as the light source units 3, it is required to be maintained in a certain working situation so as to have a long service life and a high luminous efficiency. However, laser light signal usually contains excess energy such that the optical fiber units 4 might receive the laser light signal with the energy exceeding the optical communication standard. To solve this problem, the material and the structure of the plated films 211, 221 may be varied for decreasing the energy of the laser light signal.

The design and disposition of the first, second and monitoring optical paths (I, II, V) allow the second collimating unit 18 to be located between the first and third collimating units 17, 19. That is, when this disclosure is applied to be the optical fiber adapter, the photo detector units 5 are located between the light source units 3 and the optical fiber units 4, allowing the photo detector units 5 to be located near the light source units 3, thereby reducing the overall dimension of the optical fiber adapter.

It is worth mentioning that this disclosure is exemplified to work with multiple light beams 31. However, the present disclosure may also work with only one light beam.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical element comprising:
    a lens component having a first surface, a second surface, a third surface, a fourth surface, a fifth surface, a sixth surface, a seventh surface, a first collimating unit that is formed on said first surface, a second collimating unit that is formed on said first surface and that is spaced apart from said first collimating unit, and a third collimating unit that is formed on said second surface, said second collimating unit being located between said first and third collimating units, said first, second, third, fourth, fifth, sixth and seventh surfaces being disposed around and parallel to a reference axis, said third surface being formed with a groove that is defined by said fourth, fifth, sixth and seventh surfaces, said fourth and fifth surfaces respectively corresponding to said first and second surfaces; and
    a filter disposed on said third surface and covering said groove, said filter having a first side surface that faces said fourth, fifth, sixth and seventh surfaces, and a second side surface that is opposite to said first side surface;
    wherein, when light beams incident on said first collimating unit propagate within said lens component along a first optical path to enter, by refraction through said fourth surface, and propagate within said groove to reach said first side surface, a part of the light beams enters, by refraction through said first side surface of said filter, and propagates within said filter along a second optical path, followed by being sequentially reflected by said second side surface, refracted through said first side surface, and refracted through said fifth surface to exit said lens component through said third collimating unit, and a remaining part of the light beams is reflected by said first side surface to propagate along a monitoring optical path and is sequentially refracted through said sixth surface and reflected by said seventh surface to exit said lens component through said second collimating unit.

2. The optical element as claimed in claim 1, wherein said first collimating unit includes a plurality of rounded first protrusions arranged in a width direction which is parallel to the reference axis, said second collimating unit includes a plurality of rounded second protrusions arranged in the width direction, and said third collimating unit includes a plurality of rounded third protrusions arranged in the width direction.

3. The optical element as claimed in claim 1, wherein the reflection of the part of the light beams by said second side surface is a total reflection, and the reflection of the remaining part of the light beams by said seventh surface is a total reflection.

4. The optical element as claimed in claim 1, wherein said first side surface of said filter is formed with a plated film.

5. The optical element as claimed in claim 1, wherein said second side surface of said filter is formed with a plated film.

6. An optical element comprising:
    a lens component having a first surface, a second surface, a third surface, a fourth surface, a fifth surface, a first collimating unit that is formed on said first surface, a second collimating unit that is formed on said first surface and that is spaced apart from said first collimating unit, and a third collimating unit that is formed on said second surface, said second collimating unit being located between said first and third collimating units, said first, second, third, fourth and fifth surfaces being disposed around and parallel to a reference axis, said third surface being formed with a groove that is defined by said fourth and fifth surfaces, said fourth and fifth surfaces respectively corresponding to said first and second surfaces; and
    a filter disposed on said third surface and covering said groove, said filter having a first side surface that faces said fourth and fifth surfaces;
    wherein, when light beams incident on said first collimating unit propagate within said lens component along a first optical path to enter, by passing through said fourth surface, and propagate within said groove and are reflected by said first side surface to reach said fifth surface, a part of the light beams enters, by refraction through said fifth surface, and propagates within said lens component along a second optical path to exit said lens component through said third collimating unit, and a remaining part of the light beams is reflected by said fifth surface to propagate along a monitoring optical path and to exit said lens component through said second collimating unit.

7. The optical element as claimed in claim 6, wherein said first surface has an incident surface portion and an exit surface portion, said first collimating unit being formed on said incident surface portion, said second collimating unit being formed on said exit surface portion, the remaining part of the light beams, after being reflected by said fifth surface and before exiting said lens component, being subsequently reflected by said first side surface, and refracted through said fifth surface.

8. The optical element as claimed in claim 6, wherein said lens component further has a sixth surface disposed between said first and second surfaces and corresponding to said fifth surface, the remaining part of the light beams, after being reflected by said fifth surface and before exiting said lens component, being sequentially reflected by said first side surface, refracted through said fifth surface, and reflected by said sixth surface.

9. The optical element as claimed in claim 6, wherein said lens component further has a sixth surface corresponding to said fifth surface, said fifth surface having a flat surface portion and an extending surface portion, said groove being defined by said fourth surface and said flat surface and extending surface portions of said fifth surface, said second surface being disposed between said first surface and said sixth surface, the remaining part of the light beams, after being reflected by said flat surface portion of said fifth surface and before exiting said lens component, being sequentially reflected by said first side surface, refracted through said flat surface portion, and reflected by said sixth surface.

10. The optical element as claimed in claim 6, wherein the remaining part of the light beams, after being reflected by said fifth surface and before exiting said lens component, is sequentially reflected by said first side surface and refracted through said fourth surface.

11. The optical element as claimed in claim 6, wherein said first collimating unit includes a plurality of rounded first protrusions arranged in a width direction which is parallel to the reference axis, said second collimating unit includes a plurality of rounded second protrusions arranged in the width direction, and said third collimating unit includes a plurality of rounded third protrusions arranged in the width direction.

12. The optical element as claimed in claim 6, wherein said first side surface of said filter is formed with a plated film.

* * * * *